Patented Nov. 30, 1926.

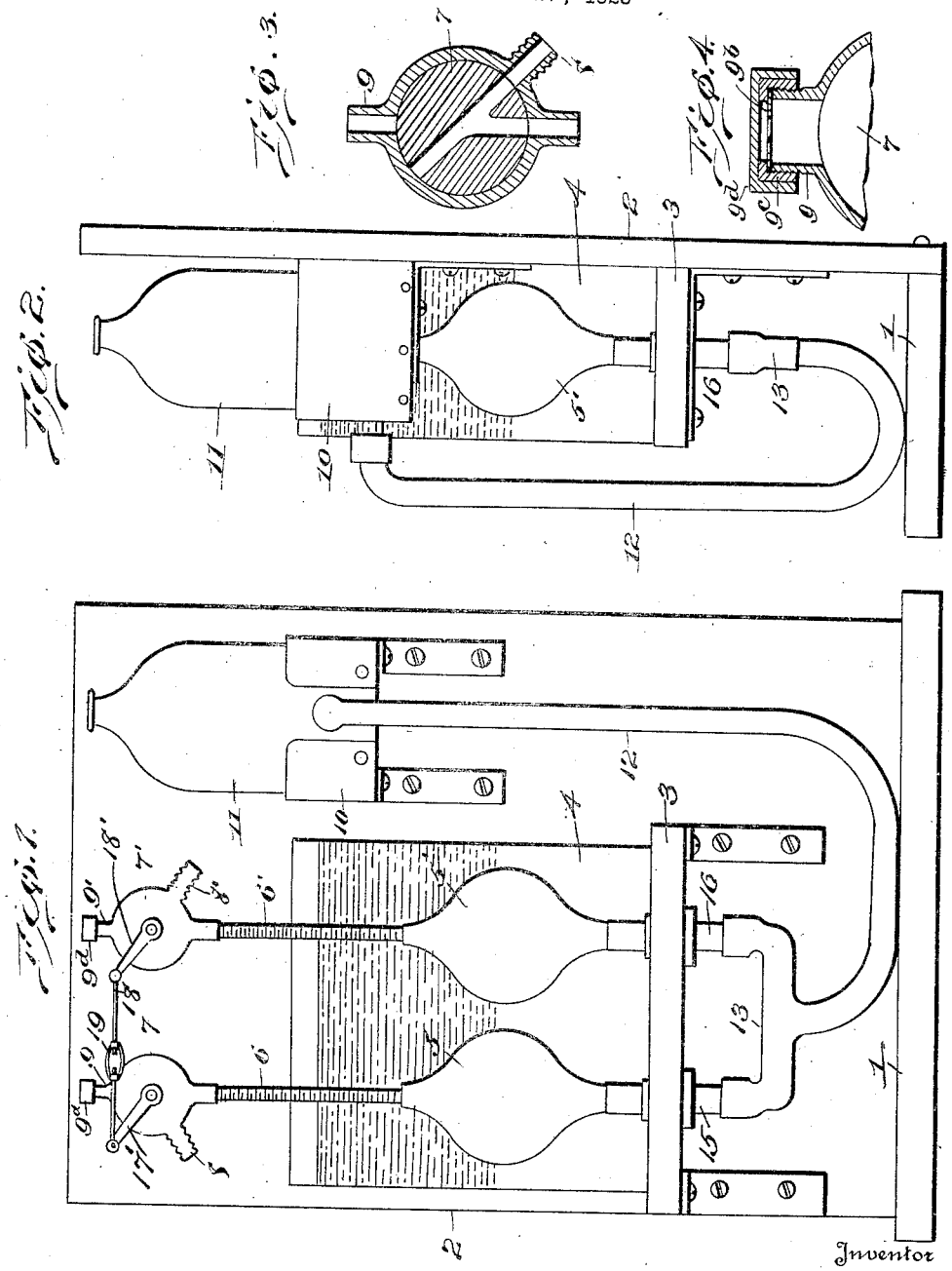

1,608,812

UNITED STATES PATENT OFFICE.

DACHE M. REEVES, OF RANTOUL, ILLINOIS.

GAS-DENSITY APPARATUS.

Application filed June 27, 1923. Serial No. 648,043.

This invention relates in general to apparatus for determining the density of a gas and more particularly to an apparatus offering various improvements over the apparatus of Bunsen, Gradewitz, Schilling and others, though functioning in accordance with the same general law.

In aeronautical work, with which I have been closely associated, it is frequently necessary to test the density and hence the purity of the gases used to inflate the gas bags of dirigibles and balloons. The Schilling process, which has been most commonly used in aeronautical work makes use of Bernouilli's law; "Two equal volumes of two gases, under the same pressure, take times proportional to the square roots of their densities in flowing through capillary orifices of equal cross-sectional area."

In the Schilling apparatus, air is introduced into a flask of a given volume. A given pressure is then applied and the air allowed to escape through a capillary orifice, the time necessary for the escape of the air being taken as accurately as possible with a stop watch. The same flask is then filled with the gas to be tested (such as hydrogen, helium, or the like in aeronautical work) and this gas, under the same pressure, allowed to escape, the time for the escape being noted. This is repeated about ten times to insure accuracy in timing and the density of the gas relative to the air determined from the equation—

$$t = \sqrt{\frac{d}{D}} T \text{ or } d = \frac{t^2}{T^2}$$

where
 $t$ = time of escape of gas,
 $T$ = time of escape of air,
 $d$ = density of the gas,
 $D$ = density of the air,
and where D is taken as the unit of comparison, i. e. D=1.

This method has two defects which it is the purpose of my invention to avoid; first, the timing must be accurate to within one-fifth of a second or the error will result in too great an error in the calculation of the density; and second, in view of the accuracy necessary in timing, the number of repeated tests necessary to insure an approximately correct average involve too much time and effort in the testing.

It is the purpose of my invention to provide a device in which the use of a stop watch is unnecessary and in which the number of tests necessary can be reduced by half.

I propose to use two flasks or bulbs, one for air and one for gas, and to measure the effusion of air and gas simultaneously. My calculation will be made from a variation of or derivation from Bernouilli's law which might be stated as follows: "Two gases, under the same pressure, will, in a given time, and flowing through capillary orifices of equal cross-sectional area, reduce their volumes by amounts proportional to the square roots of their densities." Thus if both orifices are closed when a given volume of the gas is escaped we have—

$$v = \sqrt{\frac{D}{d}}(v - V')$$

where
 $v$ = volume of gas escaped,
 $V'$ = volume of air which remains,
 $d$ = density gas,
 $D$ = density of air,
or $$d = \frac{(V - V')^2}{V^2}$$

In practice a set of tables may be prepared from which the densities can be read off from any given volume.

The construction and operation of the apparatus employing this principle will be clear to those skilled in the art by reference to the accompanying specification and claims and by reference to the drawings, in which:

Figure 1 is a front elevation of my device, and

Figure 2 is a side elevation thereof.

Figure 3 is a detail, in section, of my valve means.

Figure 4 is a detail section showing the emission orifices.

Referring with greater particularity to the drawings, my device will be seen to be comprised as follows:

A suitable base 1 and support 2 are provided for the mounting of the apparatus. A shelf 3, suitably secured to the support 2 is provided as a means for mounting the glass reservoir 4 and the two equal volume bulbs 5 and 5'. Bulbs 5 and 5' are provided with graduated stems 6 and 6' and three way valves or cocks 7 and 7'. These valves are adapted to connect the bulbs with a gas or air reservoir through tubing connections 8 and 8' as desired; or to connect the bulbs to the outlet orifices 9 and 9ª in an orifice plate 9ᵇ held in position by a suitable unit 9ᶜ. The orifices are of capillary dimensions and of equal cross-sectional area. When not in use these orifices should be covered by dust caps 9ᵈ.

The valves are provided with valve control handles 17 and 18' which are connected by a link 18, adjustable, as shown at 19, to permit of fine adjustment to insure that emission from the two orifices shall take place simultaneously.

A bracket 10 is secured to support 2 and adapted to support a leveling bottle 11. This leveling bottle has a hose connection 12 branched at 13 to provide communication with connections 15 and 16 which extend through the base of the reservoir 4 and are connected to bulbs 5 and 5', respectively.

The operation of my device is as follows:

All dust is first removed from the apparatus and the caps removed from the orifices. The reservoir is filled with sufficient water to cover the bulbs and provide for uniform temperature. The leveling bottle is then placed on the base 1 and filled with distilled water. The leveling bottle is now raised to the shelf 10, the water flowing down through tube 12 and filling the bulbs. The cocks are now turned so that the inlets 8 and 8' are in communication with tubes 6 and 6' respectively. One of the inlets 8 or 8' is connected to a gas supply and the other to an air supply or to the atmosphere. The bottle is lowered, drawing air and gas into their respective bulbs. This operation is repeated several times to flush the apparatus. Then with the bottle on base 1 the cocks are closed and the bottle placed on shelf 10, thus placing the air and gas under the same pressure. The cocks are now turned so that the orifices are simultaneously opened and the two bulbs start effusing their gases simultaneously. The operator must watch closely the height of the column of water in each bulb and as soon as the higher column reaches the end of the scale the orifices are again simultaneously closed. The volume of gas remaining above the lower column of water can then be read on the scale and the comparative density of the gas computed as above described. Accuracy can be insured by repeating this operation several times until several successive identical readings are secured.

The two orifices, 9 and 9', are desired to be made identically the same size. It may happen that through some error these two orifices may vary slightly. This may be tested by filling both bulbs with air and noting that the two columns of water in the graduated tubes rise at equal weights. The apparatus should be calibrated occasionally. If the orifices are found to have a slightly different rate of effusion for the same gas; i. e. water, then a correction can be applied to the computations to secure true readings.

I claim:

1. In a device for measuring gas densities, in combination, gas containers provided with emission orifices, and means for simultaneously placing the gas in each of said containers under equal pressure.

2. In a device for measuring gas densities, in combination, gas containers provided with valve regulated emission orifices, and adjustable means connecting said valves for simultaneously opening said orifices.

3. In a device for measuring gas densities, in combination, two gas containers of known relative volumes, said gas containers being provided with emission orifices, means for simultaneously filling said containers with the gases whose densities are to be compared, and means for simultaneously placing the gases in said containers under equal pressures.

4. In a device for measuring gas densities, in combination, two gas containers of equal volumes, said gas containers being provided with valve regulated emission orifices, adjustable means connecting said valves for simultaneously filling said containers with the gases whose densities are to be compared, and means for simultaneously opening said orifices.

5. In a device for measuring gas densities, in combination, two gas containers of known relative volumes, said gas containers being provided with emission orifices of equal sizes, means for simultaneously filling said containers with the gases whose densities are to be compared, and means for simultaneously placing the gases in said containers under equal pressure.

6. In a device for measuring gas densities, in combination, two gas containers of equal volumes, said gas containers being provided with valve regulated emission orifices of equal sizes, adjustable means connecting said valves for simultaneously filling said containers with the gases whose densities are to be compared, and means for simultaneously opening said orifices.

7. In a device for measuring gas densities, in combination, a support frame, two gas containers mounted on said frame and provided with graduated stems terminating in emission orifices of equal sizes, valve means in said stems, said containers being operatively connected at their bases to each other and to pressure varying means.

8. In a device for measuring gas densities, in combination, a support frame, two gas containers mounted on said frame and provided with graduated stems terminating in emission orifices of equal sizes, valve means in said stems, a leveling bottle, said containers being operatively connected at their bases to each other and to said leveling bottle.

9. In a device for measuring gas densities, in combination, a support frame, two gas containers mounted on said frame and provided with graduated stems terminating in emission orifices of equal sizes, valve means in said stems, a leveling bottle, said containers being operatively connected at their bases to each other and to said leveling bottle, and means for simultaneously opening said orifices.

10. In a device for measuring gas densities, in combination, a support frame, two gas containers mounted on said frame and provided with graduated stems terminating in emission orifices or equal sizes, valve means in said stems, a leveling bottle, said containers being operatively connected at their bases to each other and to said leveling bottle, and adjustable means for simultaneously opening said orifices.

11. In a device for measuring gas densities, in combination gas containers provided with emission orifices, means for simultaneously placing the gas in each of said containers under equal pressure, and means for equalizing the temperature of said gases.

12. In a device for measuring gas densities, in combination, a support frame, two gas containers mounted on said frame and provided with graduated stems terminating in emission orifices of equal sizes, valve means in said stems, said containers being operatively connected at their bases to each other to a leveling bottle, and means for equalizing the temperature of the gases in said gas containers.

In testimony whereof I affix my signature.

DACHE M. REEVES.